United States Patent
Stefanski et al.

(10) Patent No.: US 9,915,435 B2
(45) Date of Patent: Mar. 13, 2018

(54) INTELLIGENT HVAC CONTROL INCLUDING AUTOMATIC FURNACE SHUTDOWN EVENT PROCESSING

(71) Applicant: Google Inc., Mountain View, CA (US)

(72) Inventors: Mark Stefanski, San Francisco, CA (US); Marie Pellat, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 369 days.

(21) Appl. No.: 14/832,597

(22) Filed: Aug. 21, 2015

(65) Prior Publication Data

US 2017/0051925 A1    Feb. 23, 2017

(51) Int. Cl.
G06F 1/00       (2006.01)
F24D 19/10      (2006.01)
F24H 9/20       (2006.01)
F24F 1/00       (2011.01)
G05B 15/02      (2006.01)
G05D 23/19      (2006.01)
F24F 11/00      (2018.01)

(52) U.S. Cl.
CPC ............ F24D 19/1084 (2013.01); F24F 1/00 (2013.01); F24F 11/0012 (2013.01); F24F 11/0015 (2013.01); F24F 11/0034 (2013.01); F24H 9/2085 (2013.01); G05B 15/02 (2013.01); G05D 23/1917 (2013.01); F24F 2011/0091 (2013.01); G06F 1/00 (2013.01)

(58) Field of Classification Search
CPC ............... G06F 1/00; F24F 1/00; G05B 15/02
USPC ............ 126/110 A; 431/23, 68; 700/278, 14
See application file for complete search history.

(56) References Cited

U.S. PATENT DOCUMENTS

| 4,411,385 | A | * | 10/1983 | Lamkewitz | .......... | B60H 1/2206 236/91 B |
| 5,103,078 | A | * | 4/1992 | Boykin | .............. | G05D 23/1904 219/486 |
| 5,377,909 | A | | 1/1995 | Kirkpatrick | | |
| 6,837,619 | B2 | | 1/2005 | Cho et al. | | |
| 8,630,742 | B1 | * | 1/2014 | Stefanski | ............... | H05B 1/028 700/14 |
| 9,003,816 | B2 | * | 4/2015 | Stefanski | ............. | F24F 11/0086 62/115 |

(Continued)

Primary Examiner — Gregory Huson
Assistant Examiner — Nikhil Mashruwala
(74) Attorney, Agent, or Firm — Van Court & Aldridge LLP

(57) ABSTRACT

This patent specification relates to methods and systems that can detect over cycling conditions that exist in an HVAC system. The over cycling condition can be caused by overheating of a forced air heating system or furnace of the HVAC system control. When the furnace overheats, a thermally actuated limit switch within the furnace may cut off power to a heat generation apparatus. The limit switch can reconnect the power to the heat generation apparatus after it has cooled down, at which point the thermostat control system may issue another heating call to continue heating the enclosure so that it reaches the desired temperature. If the overheat condition persist, then the thermally actuated switch will cut power, resulting in repeated power cycling. The detection system and methods can monitor these power loss events and use them as data points for determining whether an alert condition exists within the HVAC system.

18 Claims, 7 Drawing Sheets

(56) References Cited

U.S. PATENT DOCUMENTS

| | | | |
|---|---|---|---|
| 9,098,279 B2* | 8/2015 | Mucignat | H04L 12/2825 |
| 9,459,018 B2* | 10/2016 | Fadell | F24F 11/0009 |
| 2013/0103622 A1* | 4/2013 | Matsuoka | H04L 12/2825 |
| | | | 706/12 |
| 2013/0190932 A1* | 7/2013 | Schuman | G05D 23/1902 |
| | | | 700/278 |
| 2014/0200719 A1* | 7/2014 | Fadell | G06Q 10/20 |
| | | | 700/276 |
| 2015/0308705 A1* | 10/2015 | Sloo | F24F 11/0086 |
| | | | 700/276 |
| 2017/0146261 A1* | 5/2017 | Rogers | F24F 11/0012 |

* cited by examiner

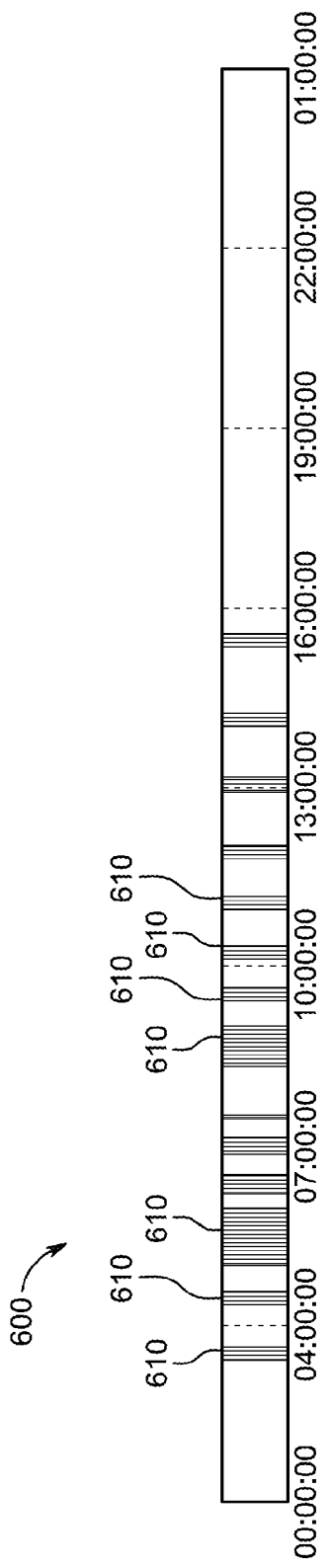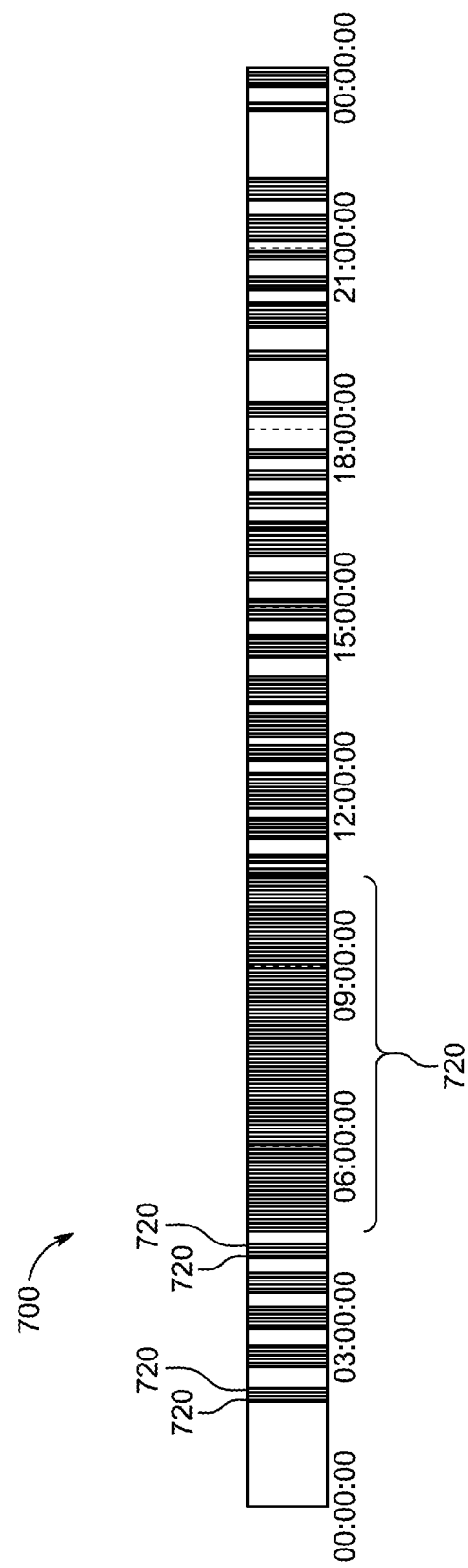

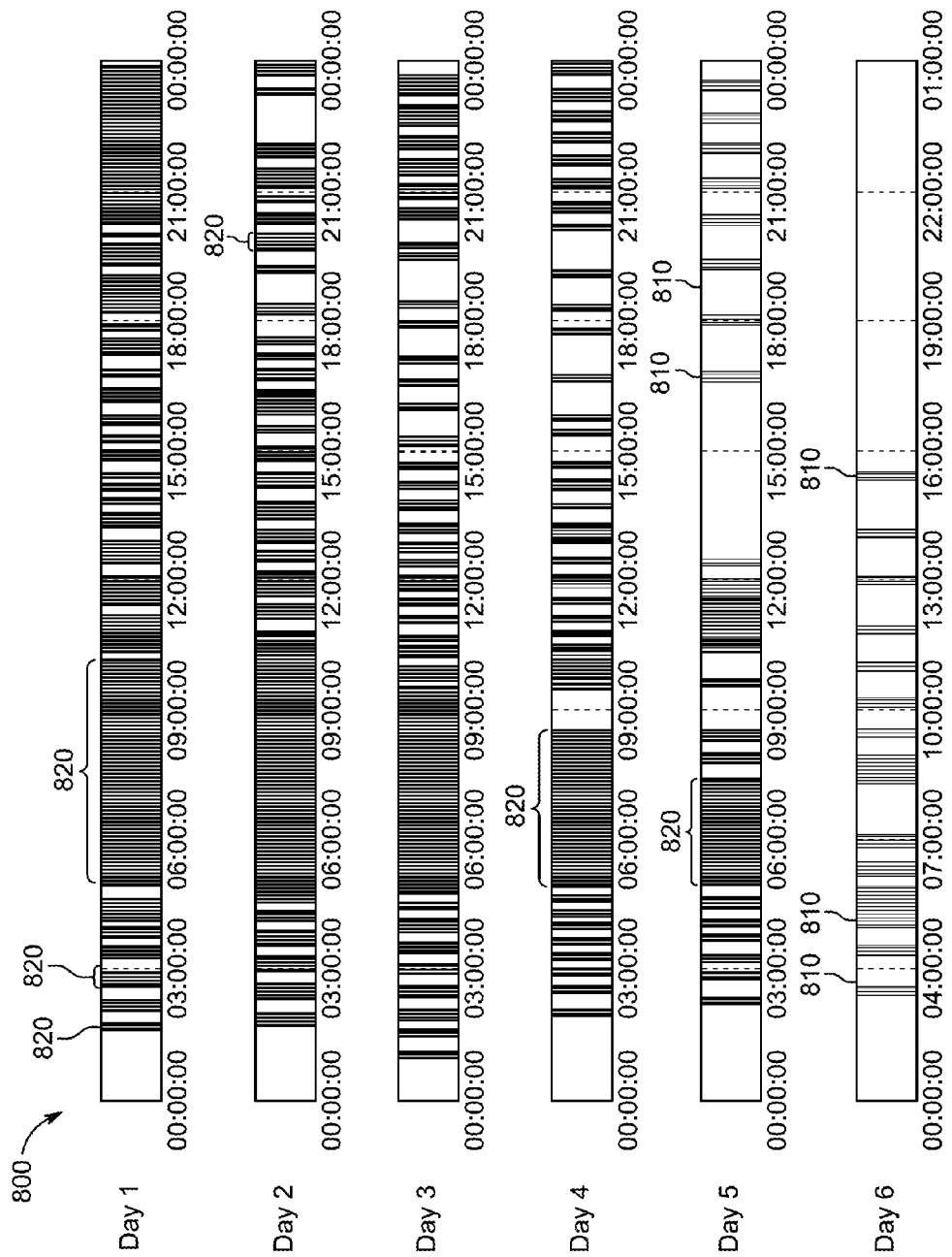

INTELLIGENT HVAC CONTROL INCLUDING AUTOMATIC FURNACE SHUTDOWN EVENT PROCESSING

TECHNICAL FIELD

This patent specification relates to systems and methods for the monitoring and control of energy-consuming systems or other resource-consuming systems. More particularly, this patent specification relates to control units that govern the operation of energy-consuming systems, household devices, or other resource-consuming systems, including systems and methods for determining whether abnormal operating conditions exists within heating, ventilation, and air conditioning (HVAC) systems.

BACKGROUND

Substantial effort has been put forth on the development of new and more sustainable energy supplies, as well as efforts to increase energy efficiency of existing energy consumption systems. An example of an energy consumption system is the heating and cooling system of an enclosure such as a home or building. Heating and cooling can account for a large percentage of the energy use in a typical home, making it a significant energy expense. Heating and cooling systems can realize greater efficiency by improving physical aspects of the system (e.g., higher efficiency furnace) and enclosure (e.g., more or better insulation). Substantial increases in energy efficiency can also be achieved through enhanced thermostat control of the heating and cooling system.

Despite advances in thermostat control of heating and cooling systems, some systems suffer from various conditions that affect a heating and cooling system's ability to operative efficiently and provide adequate comfort to occupants. Accordingly, what are needed are systems and methods that can detect such conditions and take steps for corrective action.

SUMMARY

This patent specification relates to systems and methods for determining whether abnormal operating conditions exists within heating, ventilation, and air conditioning (HVAC) systems. More particularly, this patent specification relates to methods and systems that can detect over cycling conditions that exist in an HVAC system. The over cycling condition can be caused by overheating of a forced air heating system or furnace of the HVAC system control. When the furnace overheats, a thermally actuated limit switch within the furnace may cut off power to a heat generation apparatus. The limit switch can reconnect the power to the heat generation apparatus after it has cooled down, at which point the thermostat control system may issue another heating call to continue heating the enclosure so that it reaches the desired set point temperature. If the overheat condition persist, then the thermally actuated switch will cut power. Thus, the furnace may power cycle ON and OFF several times before a desired set point temperature is obtained. The detection system and methods can monitor these power loss events and use them as data points for determining whether an alert condition exists within the HVAC system.

In one embodiment, a method for controlling a HVAC (heating, ventilation, and air conditioning) system that uses forced air heating is provided. The method can be implemented in a thermostat. The method may obtain power loss data points during a moving window of heat cycles, wherein each heat cycle is called by the thermostat to instruct the HVAC system to generate forced air heating from a start time to an end time. The method can calculate a mean duration of a fixed number of provoking heat cycles, wherein a provoking heat cycle is characterized by a premature end time caused by a HVAC system induced power loss. The method can determining whether an alert condition exists by comparing a ratio of the number of provoking heat cycles that exceed the mean duration and the number of heat cycles that exceed the mean duration to an alert threshold, and confirm that the alert condition exists if the ratio exceeds the alert threshold.

In another embodiment, a thermostat is provided that includes several HVAC (heating, ventilation, and air conditioning) wire connectors operative to receive a plurality of HVAC wires corresponding to an HVAC system including a forced air furnace. The thermostat can include control circuitry operative to execute a heating call that causes the HVAC system to run the forced air furnace through a heat cycle, monitor whether the heat cycle results in a provoking heat cycle, wherein the provoking heat cycle is characterized by a premature ending of the heat cycle caused by a furnace system induced power loss, and determine whether an alert condition exists when at least one provoking heat cycle is monitored.

A further understanding of the nature and advantages of the embodiments discussed herein may be realized by reference to the remaining portions of the specification and the drawings.

BRIEF DESCRIPTION OF THE DRAWINGS

FIG. 6 shows illustrative timing diagram of heat cycles that may occur throughout a day, according to an embodiment;

FIG. 7 shows illustrative timing diagram of provoking heat cycles that may occur when an HVAC heating system is experiencing premature shutdown due to one or more issues, according to an embodiment;

FIG. 8 shows illustrative timing diagram showing provoking heat cycles and heat cycles over several days, according to an embodiment.

DETAILED DESCRIPTION OF THE INVENTION

Figure 1:
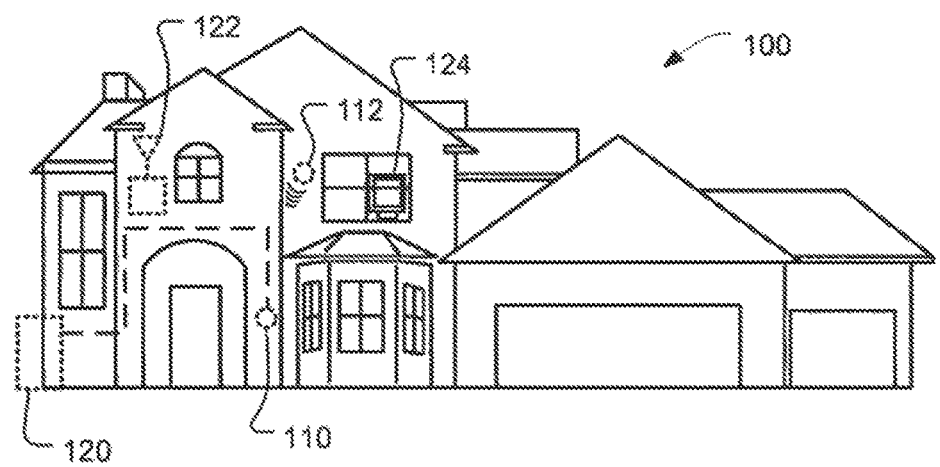
FIG. 1 is a diagram of an enclosure with an HVAC system, according to some embodiments.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more embodiments are described further herein in the context of typical HVAC systems used in a residential home, such as single-family residential home, the scope of the present teachings is not so limited. More generally, thermostats according to one or more of the preferred embodiments are applicable for a wide variety of enclosures having one or more HVAC systems including, without limitation, duplexes, townhomes, multi-unit apartment buildings, hotels, retail stores, office buildings and industrial buildings. Further, it is to be appreciated that while the terms user, customer, installer, homeowner, occupant, guest, tenant, landlord, repair person, and the like may be used to refer to the person or persons who are interacting with the thermostat or other device or user interface in the context of one or more scenarios described herein, these references are by no means to be considered as limiting the scope of the present teachings with respect to the person or persons who are performing such actions.

Provided according to one or more embodiments are systems, methods, computer program products, and related business methods for controlling one or more HVAC systems based on one or more versatile sensing and control units (VSCU units), each VSCU unit being configured and adapted to provide sophisticated, customized, energy-saving HVAC control functionality while at the same time being visually appealing, non-intimidating, elegant to behold, and delightfully easy to use. The term "thermostat" is used hereinbelow to represent a particular type of VSCU unit (Versatile Sensing and Control) that is particularly applicable for HVAC control in an enclosure. Although "thermostat" and "VSCU unit" may be seen as generally interchangeable for the contexts of HVAC control of an enclosure, it is within the scope of the present teachings for each of the embodiments hereinabove and hereinbelow to be applied to VSCU units having control functionality over measurable characteristics other than temperature (e.g., pressure, flow rate, height, position, velocity, acceleration, capacity, power, loudness, brightness) for any of a variety of different control systems involving the governance of one or more measurable characteristics of one or more physical systems, and/or the governance of other energy or resource consuming systems such as water usage systems, air usage systems, systems involving the usage of other natural resources, and systems involving the usage of various other forms of energy.

FIG. 1 is a diagram illustrating an exemplary enclosure using a thermostat 110 implemented in accordance with the present invention for controlling one or more environmental conditions. For example, enclosure 100 illustrates a single-family dwelling type of enclosure using a learning thermostat 110 (also referred to for convenience as "thermostat 110") for the control of heating and cooling provided by an HVAC system 120. Alternate embodiments of the present invention may be used with other types of enclosures including a duplex, an apartment within an apartment building, a light commercial structure such as an office or retail store, or a structure or enclosure that is a combination of these and other types of enclosures.

Some embodiments of thermostat 110 in FIG. 1 incorporate one or more sensors to gather data from the environment associated with enclosure 100. Sensors incorporated in thermostat 110 may detect occupancy, temperature, light and other environmental conditions and influence the control and operation of HVAC system 120. Sensors incorporated within thermostat 110 do not protrude from the surface of the thermostat 110 thereby providing a sleek and elegant design that does not draw attention from the occupants in a house or other enclosure. As a result, thermostat 110 and readily fits with almost any décor while adding to the overall appeal of the interior design.

As used herein, a "learning" thermostat refers to a thermostat, or one of plural communicating thermostats in a multi-thermostat network, having an ability to automatically establish and/or modify at least one future setpoint in a heating and/or cooling schedule based on at least one automatically sensed event and/or at least one past or current user input.

As used herein, a "primary" thermostat refers to a thermostat that is electrically connected to actuate all or part of an HVAC system, such as by virtue of electrical connection to HVAC control wires (e.g. W, G, Y, etc.) leading to the HVAC system.

As used herein, an "auxiliary" thermostat refers to a thermostat that is not electrically connected to actuate an HVAC system, but that otherwise contains at least one sensor and influences or facilitates primary thermostat control of an HVAC system by virtue of data communications with the primary thermostat.

In one particularly useful scenario, the thermostat 110 is a primary learning thermostat and is wall-mounted and connected to all of the HVAC control wires, while the remote thermostat 112 is an auxiliary learning thermostat positioned on a nightstand or dresser, the auxiliary learning thermostat being similar in appearance and user-interface features as the primary learning thermostat, the auxiliary learning thermostat further having similar sensing capabilities (e.g., temperature, humidity, motion, ambient light, proximity) as the primary learning thermostat, but the auxiliary learning thermostat not being connected to any of the HVAC wires. Although it is not connected to any HVAC wires, the auxiliary learning thermostat wirelessly communicates with and cooperates with the primary learning thermostat for improved control of the HVAC system, such as by providing additional temperature data at its respective location in the enclosure, providing additional occupancy information, providing an additional user interface for the user, and so forth.

It is to be appreciated that while certain embodiments are particularly advantageous where the thermostat 110 is a primary learning thermostat and the remote thermostat 112 is an auxiliary learning thermostat, the scope of the present teachings is not so limited. Thus, for example, while certain initial provisioning methods that automatically pair associate a network-connected thermostat with an online user account are particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of further example, while certain graphical user interfaces for remote control of a thermostat may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of even further example, while certain methods for cooperative, battery-conserving information polling of a thermostat by a remote cloud-based management server may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors.

Enclosure 100 further includes a private network accessible both wirelessly and through wired connections and may also be referred to as a Local Area Network or LAN. Network devices on the private network include a computer 124, thermostat 110 and remote thermostat 112 in accordance with some embodiments of the present invention. In one embodiment, the private network is implemented using an integrated router 122 that provides routing, wireless access point functionality, firewall and multiple wired connection ports for connecting to various wired network devices, such as computer 124. Each device is assigned a private network address from the integrated router 122 either dynamically through a service like Dynamic Host Configuration Protocol (DHCP) or statically through actions of a network administrator. These private network addresses may be used to allow the devices to communicate with each directly over the LAN. Other embodiments may instead use multiple discrete switches, routers and other devices (not shown) to perform more other networking functions in addition to functions as provided by integrated router 122.

Integrated router 122 further provides network devices access to a public network, such as the Internet, provided enclosure 100 has a connection to the public network generally through a cable-modem, DSL modem and an Internet service provider or provider of other public network service. Public networks like the Internet are sometimes referred to as a Wide-Area Network or WAN. In the case of the Internet, a public address is assigned to a specific device allowing the device to be addressed directly by other devices on the Internet. Because these public addresses on the Internet are in limited supply, devices and computers on the private network often use a router device, like integrated router 122, to share a single public address through entries in Network Address Translation (NAT) table. The router makes an entry in the NAT table for each communication channel opened between a device on the private network and a device, server, or service on the Internet. A packet sent from a device on the private network initially has a "source" address containing the private network address of the sending device and a "destination" address corresponding to the public network address of the server or service on the Internet. As packets pass from within the private network through the router, the router replaces the "source" address with the public network address of the router and a "source port" that references the entry in the NAT table. The server on the Internet receiving the packet uses the "source" address and "source port" to send packets back to the router on the private network which in turn forwards the packets to the proper device on the private network doing a corresponding lookup on an entry in the NAT table.

Entries in the NAT table allow both the computer device 124 and the thermostat 110 to establish individual communication channels with a thermostat management system (not shown) located on a public network such as the Internet. In accordance with some embodiments, a thermostat management account on the thermostat management system enables a computer device 124 in enclosure 100 to remotely access thermostat 110. The thermostat management system passes information from the computer device 124 over the Internet and back to thermostat 110 provided the thermostat management account is associated with or paired with thermostat 110. Accordingly, data collected by thermostat 110 also passes from the private network associated with enclosure 100 through integrated router 122 and to the thermostat management system over the public network. Other computer devices not in enclosure 100 such as Smartphones, laptops and tablet computers (not shown in FIG. 1) may also control thermostat 110 provided they have access to the public network where the thermostat management system and thermostat management account may be accessed. Further details on accessing the public network, such as the Internet, and remotely accessing a thermostat like thermostat 110 in accordance with embodiments of the present invention is described in further detail later herein.

In some embodiments, thermostat 110 may wirelessly communicate with remote thermostat 112 over the private network or through an ad hoc network formed directly with remote thermostat 112. During communication with remote thermostat 112, thermostat 110 may gather information remotely from the user and from the environment detectable by the remote thermostat 112. For example, remote thermostat 112 may wirelessly communicate with the thermostat 110 providing user input from the remote location of remote thermostat 112 or may be used to display information to a user, or both. Like thermostat 110, embodiments of remote thermostat 112 may also include sensors to gather data related to occupancy, temperature, light and other environmental conditions. In an alternate embodiment, remote thermostat 112 may also be located outside of the enclosure 100.

Figure 2:
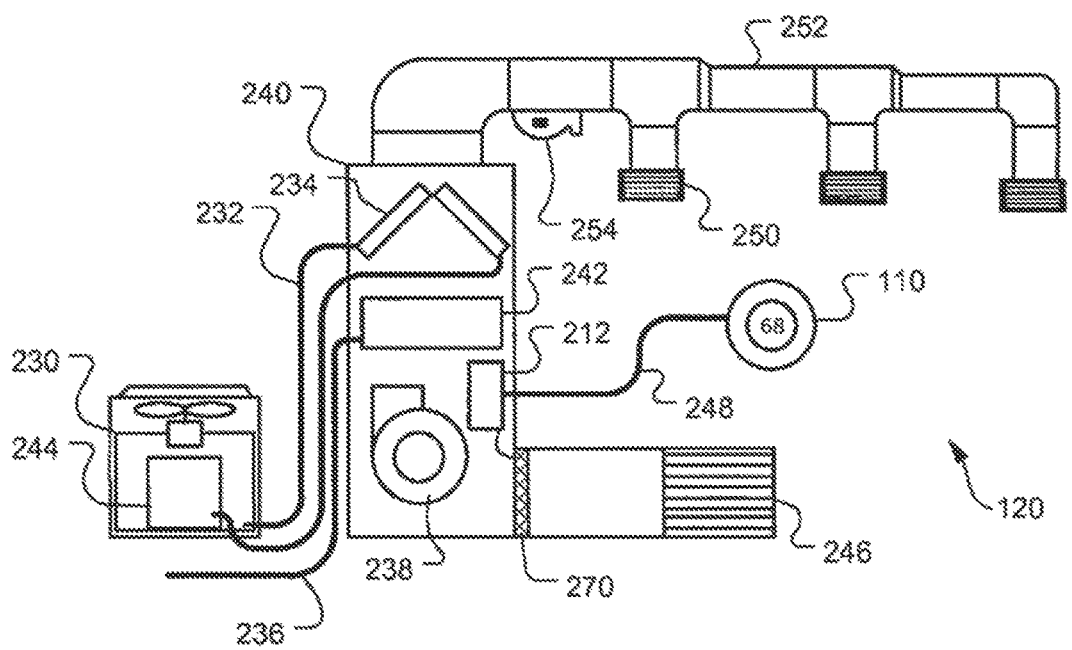
FIG. 2 is a diagram of an HVAC system, according to some embodiments.

FIG. 2 is a schematic diagram of an HVAC system controlled using a thermostat designed in accordance with embodiments of the present invention. HVAC system 120 provides heating, cooling, ventilation, and/or air handling for an enclosure 100, such as a single-family home depicted in FIG. 1. System 120 depicts a forced air type heating and cooling system, although according to other embodiments, other types of HVAC systems could be used such as radiant heat based systems, heat-pump based systems, and others.

In heating, heating coils or elements 242 within air handler 240 provide a source of heat using electricity or gas via line 236. Cool air is drawn from the enclosure via return air duct 246 through filter 270, using fan 238 and is heated through heating coils or elements 242. The heated air flows back into the enclosure at one or more locations via supply air duct system 252 and supply air registers such as register 250. The forced air system (e.g., furnace) may have a built in safety mechanism to prevent overheat conditions. For example, the furnace may have a sensor that detects an internal temperature, and if that internal temperature exceeds a threshold, the sensor can shut the furnace off. The sensor may turn the furnace off by cutting power to one or more components (e.g., air handler 240). Overheat situations may be caused by any number of different factors, one of them being restricted inlet air flow caused by dirty air filters.

In situations where the sensor is being repeatedly tripped, thereby turning the furnace off, this can affect the system's ability to efficiently heat the enclosure. Inefficiency in heating the enclosure may be realized because the thermostat is not able to complete a heat cycle because the furnace if forced to be turned off prior to the end of the heat cycle. As result, the thermostat may continue to run additional heat cycles in an attempt to reach the desired temperature. This can cause an inordinate number of heat cycles to achieve the desired setpoint temperature. Embodiments discussed herein are able determine if these prematurely ending heat cycles are occurring and can alert occupants or owner of the enclosure of a potential problem.

In cooling, an outside compressor 230 passes a gas such as Freon through a set of heat exchanger coils 244 to cool the gas. The gas then goes through line 232 to the cooling coils 234 in the air handler 240 where it expands, cools and cools the air being circulated via fan 238. A humidifier 254 may optionally be included in various embodiments that returns moisture to the air before it passes through duct system 252. Although not shown in FIG. 2, alternate embodiments of HVAC system 120 may have other functionality such as venting air to and from the outside, one or more dampers to control airflow within the duct system 252 and an emergency heating unit. Overall operation of HVAC system 120 is selectively actuated by control electronics 212 communicating with thermostat 110 over control wires 248.

Figure 3:
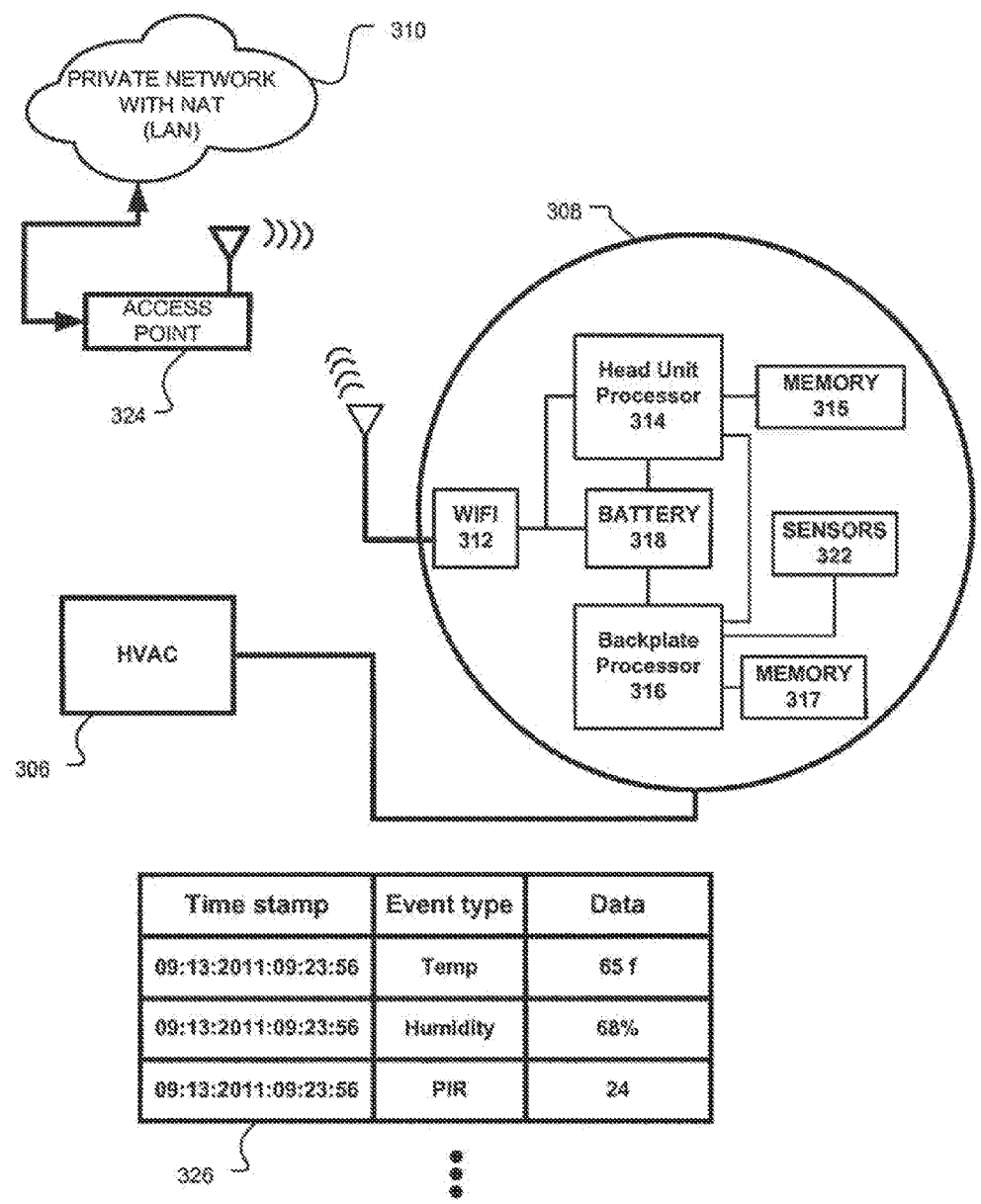
FIG. 3 is a schematic block diagram that provides an overview of some components inside a thermostat, according to some embodiments.

Referring to FIG. 3, a schematic block diagram provides an overview of some components inside a thermostat in accordance with embodiments of the present invention. Thermostat 308 is similar to thermostat 112 in FIG. 1 except that thermostat 308 also illustrates and highlights selected internal components including a Wi-Fi module 312 and antenna, a head unit processor 314 with associated memory 315, a backplate processor 316 with associated memory, and sensors 322 (e.g., temperature, humidity, motion, ambient light, proximity). In one embodiment, head unit processor 314 can be a Texas Instruments AM3703 Sitara ARM microprocessor while backplate processor 316, which may be more specifically referenced to as a "microcontroller", can be a Texas Instruments MSP430F microcontroller.

For some embodiments, the backplate processor 316 is a very low-power device that, while having some computational capabilities, is substantially less powerful than the head unit processor 314. The backplate processor 316 is coupled to, and responsible for polling on a regular basis, most or all of the sensors 322 including the temperature and humidity sensors, motion sensors, ambient light sensors, and proximity sensors. For sensors 322 that may not be located on the backplate hardware itself but rather are located in the head unit, ribbon cables or other electrical connections between the head unit and backplate are provided for this purpose. Notably, there may be other sensors (not shown) for which the head unit processor 314 is responsible, with one example being a ring rotation sensor that senses the user rotation of an outer ring of the thermostat. Each of the head unit processor 314 and backplate processor 316 is capable of entering into a "sleep" state, and then "waking up" to perform various tasks.

The backplate processor 316, which in some embodiments will have a low-power sleep state that corresponds simply to a lower clock speed, generally enters into and out of its sleep mode substantially more often than does the more powerful head unit processor 314. The backplate processor 316 is capable of waking up the head unit processor 314 from its sleep state. For one preferred embodiment directed to optimal battery conservation, the head unit processor 314 is allowed to sleep when its operations are not being called for, while the backplate processor 316 performs polling of the sensors 322 on an ongoing basis, maintaining the sensor results in memory 317. The backplate processor 316 will wake up the head unit processor 314 in the event that (i) the sensor data indicates that an HVAC operation may be called for, such as if the current temperature goes below a currently active heating setpoint, or GO the memory 317 gets full and the sensor data needs to be transferred up to the head unit processor 314 for storage in the memory 315. The sensor data can then be pushed up to the cloud server (thermostat management server) during a subsequent active communication session between the cloud server and the head unit processor 314.

In the case of Wi-Fi module 312, one embodiment may be implemented using Murata Wireless Solutions LBWA19XSLZ module, which is based on the Texas Instruments WL1270 chipset supporting the 802.11 b/g/n WLAN standard. Embodiments of the present invention configure and program Wi-Fi module 312 to allow thermostat 308 to enter into a low power or "sleep" mode to conserve energy until one or several events occurs. For example, in some embodiments the Wi-Fi module 312 may leave this low power mode when a user physically operates thermostat 308, which in turn may also cause activation of both head-unit processor 314 and backplate processor 316 for controlling functions in head-unit and backplate portions of thermostat 110.

It is also possible for Wi-Fi module 312 to wake from a low power mode at regular intervals in response to a beacon from wireless access point 372. To conserve energy, Wi-Fi module 312 may briefly leave the low power mode to acknowledge the beacon as dictated by the appropriate wireless standard and then return to a low power mode without activating the processors or other components of thermostat 308 in FIG. 3A. In an alternative embodiment, Wi-Fi module 312 may also respond to the beacon by awaking briefly and then activating backplate processor 316, head unit processor 314, or other portions of thermostat 308 to gather data through sensors 322 and store the results in a data log 326 with a time stamp, event type and corresponding data listed for future reference. In accordance with one embodiment, backplate processor 316 may collect data in data log 326 and store in memory 320 for a period of time or until the log reaches a maximum predetermined size. At that point, the backplate processor 316 may wake head unit processor 314 to coordinate an upload of the data log 326 stored in memory 320 over a public network, such as the Internet, to cloud-based management server 516. Uploading data log 326 less frequently saves time and energy associated with more frequent transmission of individual records or log entries.

In yet another embodiment, Wi-Fi module 312 may selectively filter an incoming data packet to determine if the header is merely an acknowledgement packet (i.e., a keep-alive packet) or contains a payload that needs further processing. If the packet contains only a header and no payload, the Wi-Fi module 312 may be configured to either ignore the packet or send a return acknowledgement to the thermostat management system or other source of the packet received.

In further embodiments, Wi-Fi module 312 may be used to establish multiple communication channels between thermostat 112 and a cloud-based management server as will be described and illustrated later in this disclosure. As previously described, thermostat 112 uses multiple communication channels to receive different types of data classified with different levels of priority. In one embodiment, Wi-Fi module 312 may be programmed to use one or more filters and a wake-on-LAN feature to then selectively ignore or discard data arriving over one or more of these communication channels. For example, low-priority data arriving over a port on Wi-Fi module 312 may be discarded by disabling the corresponding wake-on-LAN feature associated with the port. This allows the communication channel to continue to operate yet conserves battery power by discarding or ignoring the low-priority packets.

Operation of the microprocessors 314, 316, Wi-Fi module 312, and other electronics may be powered by a rechargeable battery (not shown) located within the thermostat 110. In some embodiments, the battery is recharged directly using 24 VAC power off a "C" wire drawn from the HVAC system or an AC-DC transformer coupled directly into the thermostat 110. Alternatively, one or more different types of energy harvesting may also be used to recharge the internal battery if these direct methods are not available.

Figure 4:
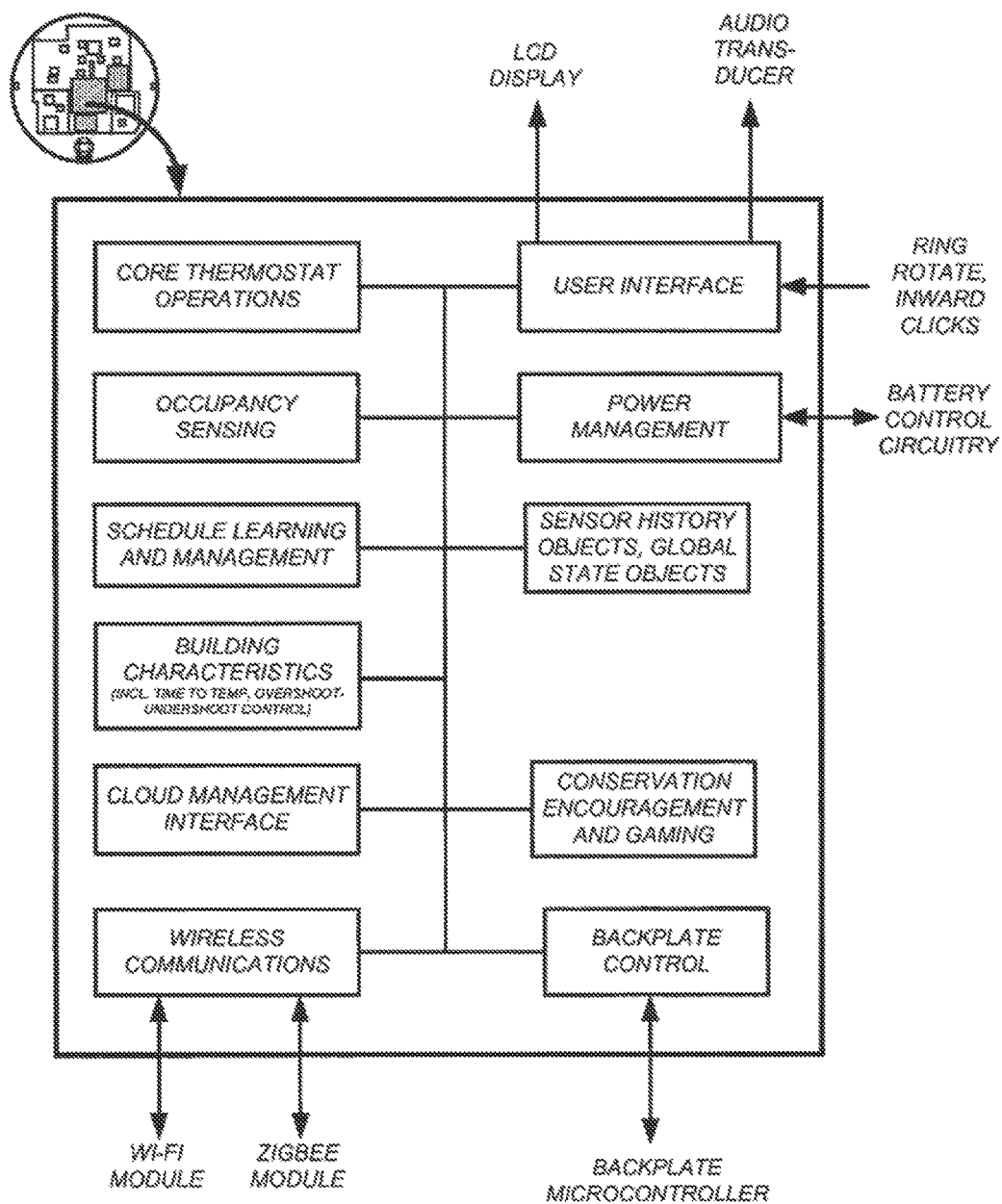
FIG. 4 illustrates a self-descriptive overview of the functional software, firmware, and/or programming architecture of the head unit microprocessor, according to an embodiment.
Figure 5:
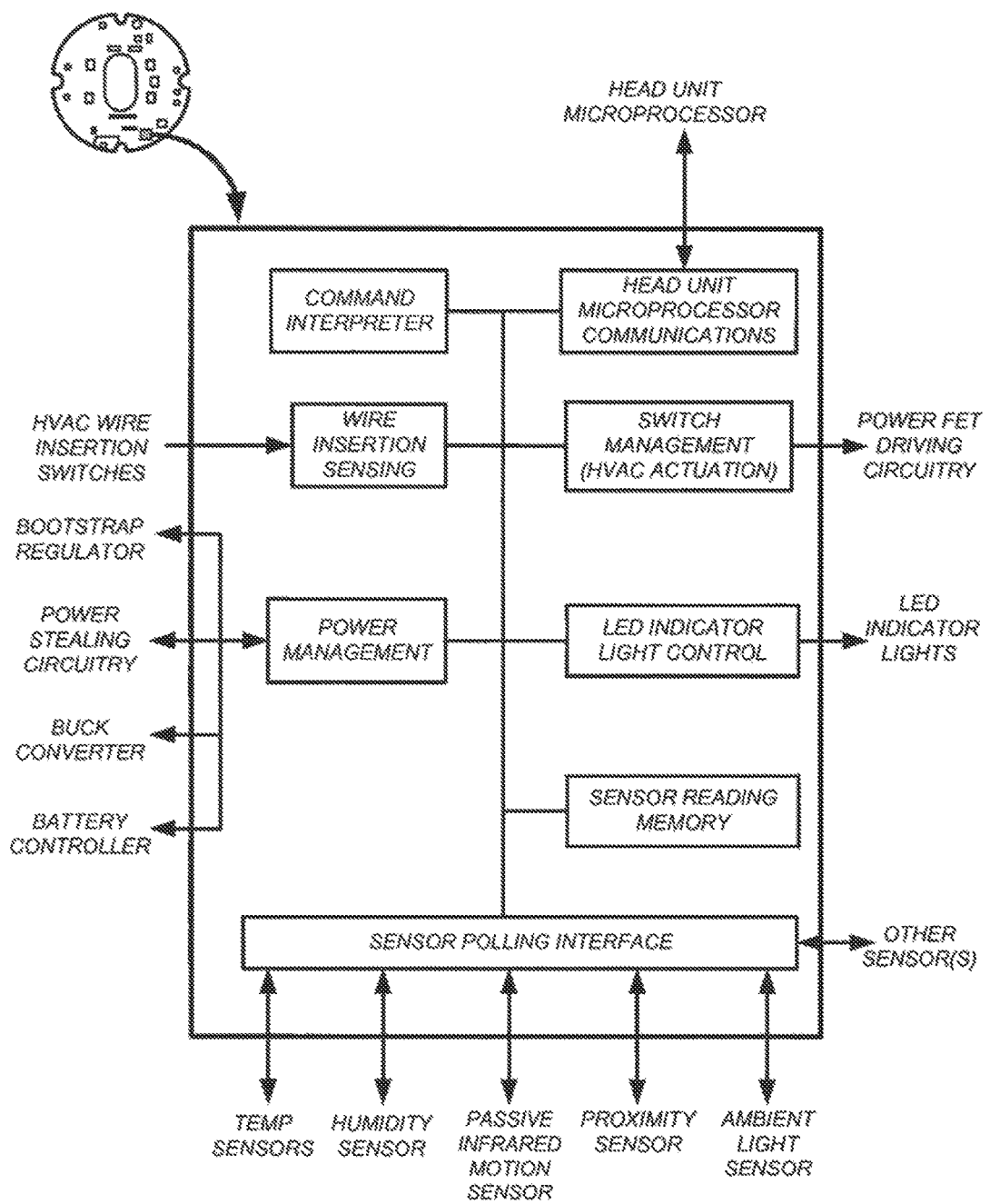
FIG. 5 illustrates a self-descriptive overview of the functional software, firmware, and/or programming architecture of the backplate microcontroller, according to an embodiment.

FIG. 4 illustrates a self-descriptive overview of the functional software, firmware, and/or programming architecture of the head unit microprocessor for achieving its described functionalities. FIG. 5 illustrates a self-descriptive overview of the functional software, firmware, and/or programming architecture of the backplate microcontroller for achieving its described functionalities.

FIG. 6 shows illustrative timing diagram 600 of heat cycles 610 that may occur throughout a day. As defined herein, a heat cycle may represent a heating function call executed by a thermostat to run a forced air heating system such as a furnace to raise the temperature of an enclosure from a start time to an end time. The start and end times of each heat cycle may vary depending, for example, on various monitored conditions within an enclosure and the desired set point temperature. Each of the heat cycles in diagram 600 are shown to run their full term without being prematurely cutoff prior to its scheduled end time. As such, diagram 600 represents an example of fully functional HVAC system that is not experiencing any issues.

FIG. 7 shows illustrative timing diagram 700 of provoking heat cycles 720 that may occur when an HVAC heating system is experiencing premature shutdown due to one or more issues. As defined herein, a provoking heat cycle may represent a heat cycle that ends prematurely, due to power loss. That is, the provoking heat cycle may be initiated as a thermostat controlled function call to run a forced air heating system, but is not able to run to the scheduled end time because the forced air heating system shuts itself down by cutting power to one or more components controlling the operation of the system. In simplistic terms, a provoking heat cycle is a heat cycle ended by a power loss.

Timing diagram 700 shows that the thermostat may have to cycle the heating system several times in order to raise the temperature to a desired set point when it is constantly implementing provoking heat cycles. This is contrast to normal heat cycles that run, and are followed by a period of rest before running another normal heat cycle. Provoking heat cycles, as shown, can run continuously without any break in between function calls so that the desired set point temperature can be obtained within the enclosure. This can cause excessive system cycling. Embodiments discussed herein can detect when such excessive system cycling is occurring and can alert occupants, owners, and/or service repair technicians of a potential issue.

FIG. 8 shows illustrative timing diagram 800 showing provoking heat cycles and heat cycles over several days. Timing diagram 800 shows that days 1-4 and part of day 5 have several instances of provoking heat cycles 820. An over cycling detection algorithm according to embodiments discussed herein may detect the occurrence of provoking heat cycles 820 and prompted corrective action. In one embodiment, the corrective action may be the replacement of a cold air return air filter. Such corrective action is shown to have taken place during day 5. After the corrective action has been taken, timing diagram 800 shows the heating system ceases repetitive occurrences of provoking heat cycles and returns to normal heat cycles 810 for the latter part of day 5 and all of day 6.

A method for detecting over cycling in a HVAC system, and in particular, a forced air heating system is now discussed. The over cycling detecting method can be executed by the thermostat without requiring any additional wire or wireless connections to the HVAC system. That is, the existing wired HVAC connections are all that are needed in order the control system of the thermostat to receive data needed to perform the over cycling detection method. In addition, the over cycling detection method can maintain a moving window during which only data acquired within that window is used for assessing whether to alert to corrective action. In some embodiments, the moving window can include data acquired during time spanning from the present to a fixed period of time in the past or can be a given number of samples (e.g., heat cycles).

Figure 9:
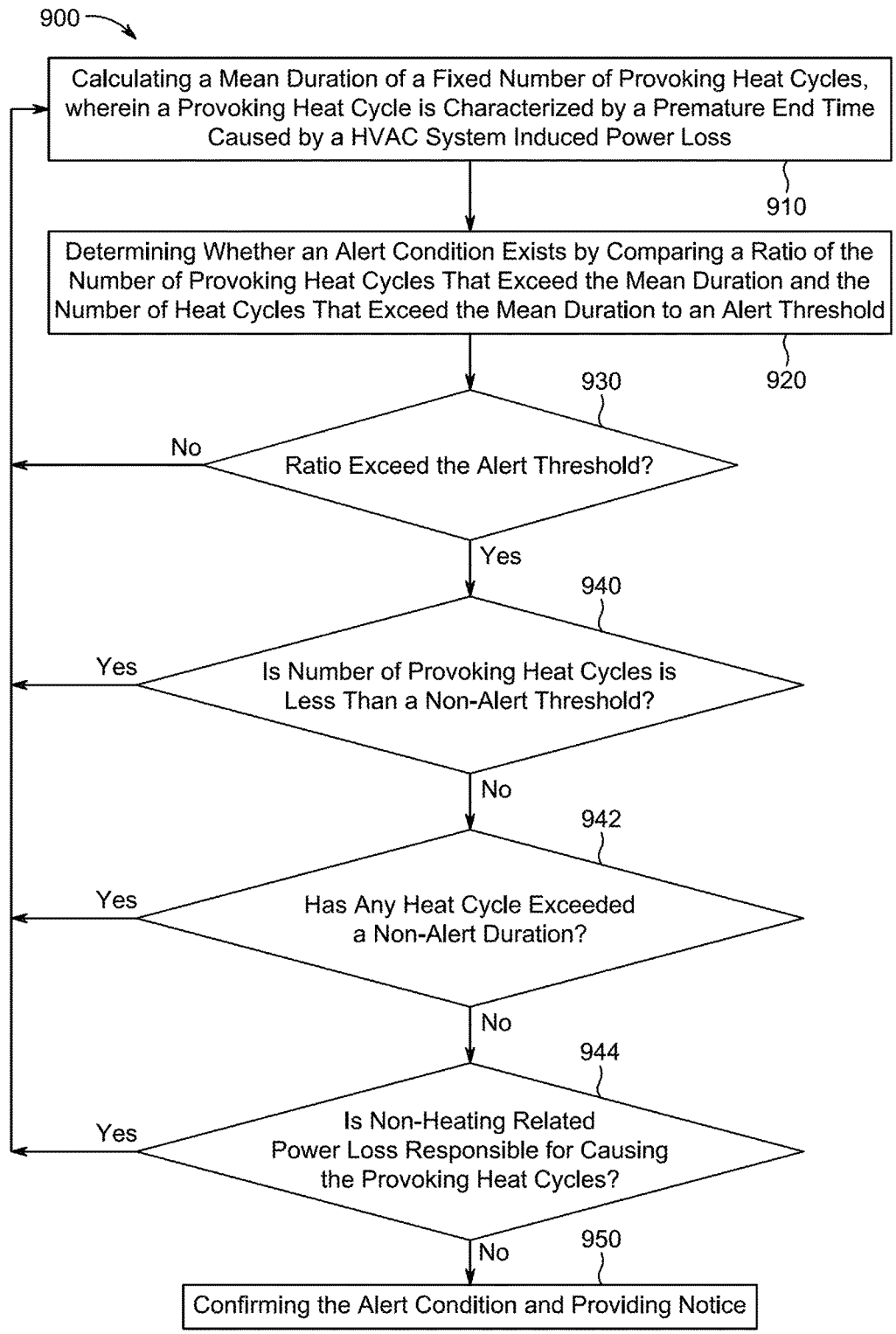
FIG. 9 shows illustrative over cycling detection process, according to an embodiment.

FIG. 9 shows illustrative over cycling detection process 900 according to an embodiment. Process 900 may be executed in a thermostat and include data acquired during a moving window of heat cycles, wherein each heat cycle is called by the thermostat to instruct a HVAC system to generate forced air heating from a start time to an end time. In one embodiment, the moving window of heat cycles can include a fixed number of the previously monitored heat cycles. It should be understood that the heat cycles can include normal heat cycles and provoking heat cycles. Starting at step 910, a mean duration of a fixed number of provoking heat cycles can be calculated. As mentioned above, a provoking heat cycle can be characterized by a premature end time caused by a HVAC system induced power loss. The fixed number of provoking heat cycles may be less than the fixed number of monitored heat cycles.

At step 920, a determination of whether an alert condition exists can be performed by comparing a ratio of the number of provoking heat cycles that exceed the mean duration and the number of heat cycles that exceed the mean duration to an alert threshold. The ratio can be calculated in the equation below.

$$\text{Ratio} = \frac{\text{\# provoking heat cycles} > \text{mean duration}}{\text{\# heat cycles} > \text{mean duration}}$$

The alert threshold can be a number that determines whether an alert condition exists. That is, at step 930, a determination is made whether the ratio exceeds the alert threshold. If the determination is YES, process 900 proceeds to step 940, otherwise process 900 returns to step 910. Step 940 and steps 942, and 944 represent various non-alert conditions. The non-alert conditions may represent conditions that, if satisfied, prevent process 900 from confirming that an alert condition does exist.

At step 940, a determination is made whether the number of provoking heat cycles is less than a non-alert threshold. If the determination is YES, process 900 returns to step 910. If the determination is NO, process 900 can proceed to step 942. At step 942, a determination is made whether any heat cycle exceeded a non-alert duration. For example, if any one of the heat cycles within the moving window exceeded the non-alert duration, the determination is YES, and process 900 returns to step 910. If the determination is NO, process 900 can proceed to step 944.

At step 944, a determination is made whether non-heating related power loss are responsible for causing the provoking heat cycles. This determination can be made by counting a number of normal power loss events that occur after a fixed period of time following the end of a heat cycle and comparing the count to a power loss threshold. The count can be tallied over a fixed time duration (e.g., last few days). If the count exceeds the power loss threshold, then process 900 returns to step 910. If the count is equal to or less than the power loss threshold, then process 900 can proceed to step 950.

At step 950, the alert condition is confirmed and notice can be provided. Notice can be provided in a number of different ways. Notice may be provided on the thermostat in the form a graphic, light, or audio message. Notice may be provided to a user by way of his or her mobile device in the form of a text message, email, or other notices. Notice may be provided a service technician who is registered to service the enclosure. The notice can instruct the owner to replace an air filter, for example.

It should be appreciated that the steps of FIG. 9 can be omitted or re-ordered, and additional steps can be added. For example, after the user confirms that he has replaced the air filter, the over cycling condition process can continue running. If no alert conditions are detected, the user may be notified as such. However, if an alert condition is detected, the user may be notified that a problem persist and can suggest that he make a service call on his HVAC system.

Whereas many alterations and modifications of the present invention will no doubt become apparent to a person of ordinary skill in the art after having read the foregoing description, it is to be understood that the particular embodiments shown and described by way of illustration are in no way intended to be considered limiting.

What is claimed is:

1. A method for controlling a HVAC (heating, ventilation, and air conditioning) system that uses forced air heating, the method implemented in a thermostat, the method comprising:
during a moving window of heat cycles, wherein each heat cycle is called by the thermostat to instruct the HVAC system to generate forced air heating from a start time to an end time:
calculating a mean duration of a fixed number of provoking heat cycles, wherein a provoking heat cycle is characterized by a premature end time caused by a HVAC system induced power loss;
determining whether an alert condition exists by comparing a ratio of the number of provoking heat cycles that exceed the mean duration and the number of heat cycles that exceed the mean duration to an alert threshold;
confirming that the alert condition exists if the ratio exceeds the alert threshold and at least one non-alert condition is not satisfied; and
alerting a user of the alert condition when the alert condition is confirmed.

2. The method of claim 1, wherein the moving window of heat cycles comprises a fixed number of the most recent heat cycles.

3. The method of claim 2, wherein the fixed number of provoking heat cycles is less than the fixed number of the most recent heat cycles.

4. The method of claim 1, wherein the at least one non-alert condition comprises:
determining if the number of provoking heat cycles is less than a non-alert threshold; and
preventing confirmation of the alert condition if the number of provoking heat cycles is less than the non-alert threshold.

5. The method of claim 1, wherein the at least one non-alert condition comprises:
determining if any one of the heat cycles within the moving window exceeds a minimum non-alert time threshold; and
preventing confirmation of the alert condition if any one of the heat cycles within the moving window exceeds the minimum non-alert time threshold.

6. The method of claim 1, further comprising:
verifying whether non-heating related power loss events are responsible for causing the provoking heat cycles.

7. The method of claim 6, wherein verifying whether non-heating related power loss events are responsible for causing the provoking heat cycles comprises:
during a period of time,
counting a number of normal power loss events that occur after a fixed period of time following the end of a heat cycle; and
preventing confirmation of the alert condition if the number of normal loss events exceeds a power loss threshold.

8. The method of claim 1, wherein the HVAC induced power loss is caused by an over-temperature condition existing within the HVAC system.

9. The method of claim 8, wherein the thermostat monitors the HVAC induced power loss.

10. A thermostat, comprising:
a plurality of HVAC (heating, ventilation, and air conditioning) wire connectors operative to receive a plurality of HVAC wires corresponding to an HVAC system comprising a forced air furnace;
control circuitry operative to at least partially control operation of the HVAC system, wherein the control circuitry is further operative to:
execute a heating call that causes the HVAC system to run the forced air furnace through a heat cycle, the heat cycle comprising a start time and an end time;
monitor whether the heat cycle results in a provoking heat cycle, wherein the provoking heat cycle is characterized by a premature ending of the heat cycle caused by a furnace system induced power loss;
determine whether an alert condition exist when at least one provoking heat cycle is monitored;
calculate a mean duration of a fixed number of provoking heat cycles that occur within a moving window of heat cycles;
compare a ratio of the number of provoking heat cycles that exceed the mean duration and the number of heat cycles that exceed the mean duration to an alert threshold; and
confirm that the alert condition exists if the ratio exceeds the alert threshold and at least one non-alert condition is not satisfied.

11. The thermostat of claim 10, wherein the moving window of heat cycles comprises a fixed number of the most recent heat cycles.

12. The thermostat of claim 10, wherein the control circuitry is operative to determine at least one non-alert condition by:
   determining if the number of provoking heat cycles is less than a non-alert threshold; and
   preventing confirmation of the alert condition if the number of provoking heat cycles is less than the non-alert threshold.

13. The thermostat of claim 10, wherein the control circuitry is operative to determine at least one non-alert condition by:
   determining if any one of the heat cycles within the moving window exceeds a minimum non-alert time threshold; and
   preventing confirmation of the alert condition if any one of the heat cycles within the moving window exceeds the minimum non-alert time threshold.

14. The thermostat of claim 10, wherein the control circuitry is operative to:
   verify whether non-heating related power loss events are responsible for causing the provoking heat cycles.

15. The thermostat of claim 14, wherein the control circuitry is operative to:
   count, during a period of time, a number of normal power loss events that occur after a fixed period of time following the end of a heat cycle; and
   prevent confirmation of the alert condition if the number of normal loss events exceeds a power loss threshold.

16. The thermostat of claim 10, wherein the furnace system induced power loss is caused by an over-temperature condition existing within the HVAC system.

17. The thermostat of claim 10, wherein the control circuitry is operative to:
   monitor one of the plurality of HVAC wire connectors for current loss while the furnace is operating during one of the heat cycles to determine whether the heat cycle results in a provoking heat cycle.

18. The thermostat of claim 10, wherein the control circuitry is operative to:
   alert a user of the alert condition when the alert condition is confirmed.

* * * * *